United States Patent [19]

Saegusa

[11] 4,298,870
[45] Nov. 3, 1981

[54] DEVICE FOR DRIVING A DISPLAY ELEMENT HAVING A MEMORIZING PROPERTY

[75] Inventor: Takashi Saegusa, Sagamihara, Japan
[73] Assignee: Nippon Kogaku K.K., Tokyo, Japan
[21] Appl. No.: 82,884
[22] Filed: Oct. 9, 1979

[30] Foreign Application Priority Data

Oct. 9, 1978 [JP] Japan .................... 53-123565

[51] Int. Cl.³ .................................... G02F 1/17
[52] U.S. Cl. ............................ 340/785; 340/813; 350/357
[58] Field of Search ............... 340/784, 785, 813; 350/332, 357

[56] References Cited

U.S. PATENT DOCUMENTS

| | | | |
|---|---|---|---|
| 3,938,131 | 2/1976 | Van Doorn et al. | 340/785 |
| 4,045,791 | 8/1977 | Fukai et al. | 340/813 X |
| 4,173,758 | 11/1979 | Sekine | 340/785 |
| 4,205,903 | 6/1980 | Inami et al. | 340/785 X |
| 4,209,770 | 6/1980 | Hamada et al. | 340/785 X |

*Primary Examiner*—David L. Trafton
*Attorney, Agent, or Firm*—Shapiro and Shapiro

[57] ABSTRACT

In a device for driving an electro-optical display element having a memorizing property and which produces color upon the application of a first polarity voltage thereto and loses color upon application thereto of a voltage of opposite polarity the coloration and the color-extinction taking place in response to a display command signal applied as an input to the device, there is provided means for detecting the quantity of charge stored in the display element and for generating a detection signal when the detected value of stored charge is beyond a predetermined range, means for continuously generating a pulse signal, and drive means having switch means adapted to be closed in synchronism with the pulse signal when the display command signal and the detection signal are applied as inputs, the drive means applying a voltage to the display element upon closing of the switch means.

8 Claims, 4 Drawing Figures

DEVICE FOR DRIVING A DISPLAY ELEMENT HAVING A MEMORIZING PROPERTY

BACKGROUND OF THE INVENTION

1. Field of the Invention

This invention relates to a device for driving an electro-optical display element such as electrochromic display element (hereinafter simply referred to as the EC element) having a memorizing property.

2. Description of the Prior Art

The EC element is colored when the quantity of stored charge therein produced by the application of a first polarity, e.g., positive, voltage to the element exceeds a predetermined value, and the color is removed when the quantity of charge is decreased by application of a reverse polarity voltage to the element. This element has a property that once it has assumed a coloration state, it remains colored for a period of time even if the positive voltage applied thereto is cut off, as long as a reverse polarity, i.e., negative, voltage is not applied; namely, it has a memorizing property.

In a prior device for driving a display element such as EC element, when a display command signal is applied as an input, a color producing drive circuit is operated for a predetermined time to apply a positive voltage to the display element to thereby cause the display element to produce color and after the application of such voltage has caused, the color producing drive circuit is intermittently operated at predetermined intervals as long as the display command signal is applied in order to prevent the terminal voltage of the display element from being gradually decreased due to leakage of the stored charge, thus causing the display element to lose color. This device has the merit of saving electric power because the color producing drive circuit is intermittently operated. However, due to differences in pattern areas of the display elements, or the irregularity of the characteristic of the display element itself or the variation with time in the characteristic of the display element, the time required for the display element to change from its coloration state to its colorless state differs and varies. Accordingly, if the time interval at which the drive circuit is intermittently operated is predetermined and fixed, as in the prior device, there occurs an inconvenience in that the colorless state may occur when the coloration state should exist upon the application of a display command signal, or that a voltage is wastefully applied to the EC element even when the display element is already in the coloration state.

SUMMARY OF THE INVENTION

It is an object of the present invention to eliminate the above-noted inconveniences and to provide a device for driving a display element which can positively maintain the coloration state of the display element irrespective of a difference in pattern area of the display element or irregularity of the characteristic of the display element itself or variation with time in such characteristic, and thereby ensures rational power saving.

It is a further object of the present invention to provide such a device in which, even to cause the display element to be rendered colorless, a reverse voltage is applied only when necessary, thereby achieving rational power saving.

The invention will become fully apparent from the following detailed description thereof taken in conjunction with the accompanying drawings.

DESCRIPTION OF THE PREFERRED EMBODIMENTS

Figure 1:
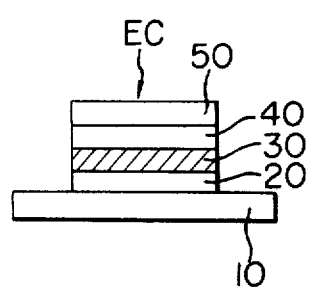
FIG. 1 shows the general construction of an EC element.

As shown in FIG. 1, an EC element (EC) generally comprises a substrate 10, an electrode 20, an electrochromic layer 30 (hereinafter simply referred to as the EC layer), a fixed electrolyte layer 40 and an electrode 50. If a positive (+) voltage and a negative (−) voltage are applied to the electrode 50 and the electrode 20, respectively, namely, if a voltage is applied in a positive direction, the EC layer is colored when the quantity of charge supplied exceeds a predetermined value. Conversely, if a negative (−) voltage and a positive (+) voltage are applied to the electrode 50 and the electrode 20, respectively, namely, if a voltage is applied in the reverse direction, the EC layer is rendered colorless when the quantity of charge is decreased below the predetermined value. The characteristic in a case where a triangular wave voltage being applied in the positive direction to the EC element EC, and, thereafter, a similar triangular wave voltage being applied in the reverse direction of the EC element EC, is as shown in FIG. 2.

Figure 2:
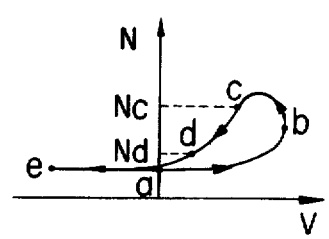
FIG. 2 illustrates the characteristic of the EC element.

In FIG. 2, the abscissa represents the voltage applied to the EC element and the ordinate represents the color density of the EC element (exactly, the EC layer), and the density thereof is varied from a→b→c→d→e→a by the application of the aforementioned voltages. In the present invention, the limit density for which the coloration of the EC element can be recognized is defined as Nc, and the limit density for which the color-extinction of the EC element can be recognized is defined as Nd. If the color density of the EC element is greater than Nc, it is said that "the EC element is in a sufficient coloration state." If the color density of the EC element is between Nc and Nd, namely, if the EC element is in a condition in which the coloration or the color-extinction is vague, it is said that "the EC element is in an insufficient coloration state," and if the color density of the EC element is below Nd, it is said that "the EC element is in a sufficient colorless state." The terminal voltages of the EC element corresponding to Nc and Nd are defined as Vc and Vd, respectively. That is, the color density of the EC element depends on the quantity of charge stored in the EC element, and in the present device, it is intended to determine such quantity of charge from the voltages Vc and Vd in open condition, i.e., in the absence of applied voltage.

Figure 3:
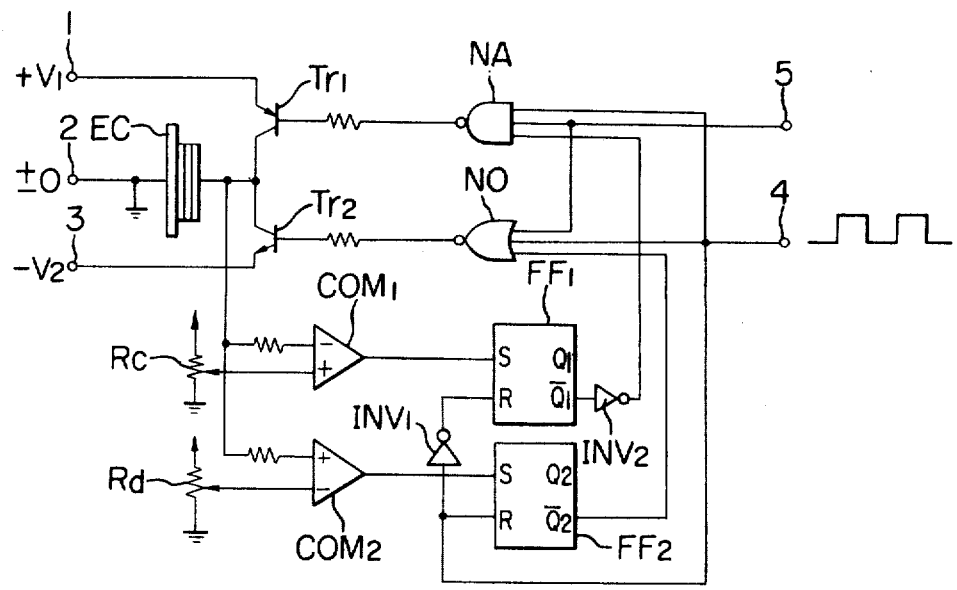
FIG. 3 is a diagram of a circuit according to a preferred embodiment of the present invention.

Reference is now had to FIG. 3 to describe an example of a circuit in accordance with the present invention.

Among power source terminals 1, 2 and 3, the power source terminal 2 is grounded, and a positive voltage −V1 is applied between the power source terminals 1 and 2 and a negative voltage −V2 is applied between the power source terminals 2 and 3. EC designates the aforementioned EC element. Although an EC element is used in the present embodiment, the display element in the present invention may be any device having a memorizing property like that of an EC element and is not restricted to the EC element. A transistor Tr1 controls the application of positive voltage to the EC element EC in accordance with the output of a NAND circuit NA, which will hereinafter be described. A transistor Tr2 controls the application of negative voltage to the EC element EC in accordance with the output of a NOR circuit which will also be described hereinafter. A resistor Rc sets the afore-mentioned detection voltage Vc. A comparator COM 1 compares the detection voltage Vc with the terminal voltage $V_{EC}$ of the EC element EC and produces a "1" when it detects that $V_{EC} < Vc$ and generates "0". A flip-flop circuit FF1 receives the output of the comparator COM 1 at the S terminal thereof, and clock pulses applied to a terminal 4 are inverted by an inverter INV 1 and applied to the R terminal. The output of this flip-flop circuit FF1 is as shown in Table 1 below. An inverter INV 2 inverts the output of Q1. That is, the flip-flop circuit FF1 and the inverter INV 1 produce "1" from the inverter INV 2 in synchronism with the clock pulses when the comparator COM 1 detects that $V_{EC} < Vc$.

TABLE 1

| S | R | Q1 | Q1 |
|---|---|----|----|
| 0 | 0 | $Q_o$ | $\bar{Q}_o$ |
| 0 | 1 | 1 | 0 |
| 1 | 0 | 0 | 1 |
| 0 | 1 | 1 | 1 |

The above-described elements Rc, COM 1, FF1, INV 1 and INV 2 together constitute a first detecting circuit.

A resistor Rd sets the aforementioned detection voltage Vd. A comparator COM 2 compares the detection voltage Vd with the terminal voltage of the EC element EC, and generates a "1" when it detects that $Vd < V_{EC}$ and produces a "0" otherwise. A flip-flop circuit FF2 receives the output of the comparator COM 2 at the S terminal thereof, and receives clock pulses applied to the terminal 4 at the R terminal thereof. The output of this flip-flop circuit FF2 is similar to that shown in Table 1 and Q1 and Q1 may be replaced with Q2 and Q2, resrectively. That is, the flip-flop circuit FF2 produces "0" in synchronism with the clock pulses when the comparator COM 2 detects that $Vd < V_{EC}$. The above-described elements Rd, COM 2 and FF2 together constitute a second detecting circuit.

A terminal 5 is one to which a display command signal is applied. In the present specification, when "1" has been applied to the terminal 5, it is said that "the command signal has been applied", and when "0" has been applied to the terminal 5, it is said that "the command signal has disappeared." The aforementioned NAND circuit NA receives as inputs the signal applied to the terminal 5, the clock pulses applied to the terminal 4, and the output signal of the first detecting circuit, and generates "0" when all the three inputs have become "1," thereby rendering the transistor Tr1 conductive. The above-described elements NA and Tr1 together constitute a color-producing drive circuit. The aforementioned NOR circuit NO receives as inputs the signal applied to the terminal 5, the clock pulses applied to the terminal 4 and the output signal of the second detecting circuit, and produces "1" when all these three inputs have become "0," thereby rendering the transistor Tr2 conductive. The above-described elements NO and Tr2 together constitute a color-extinction drive circuit.

Figure 4:
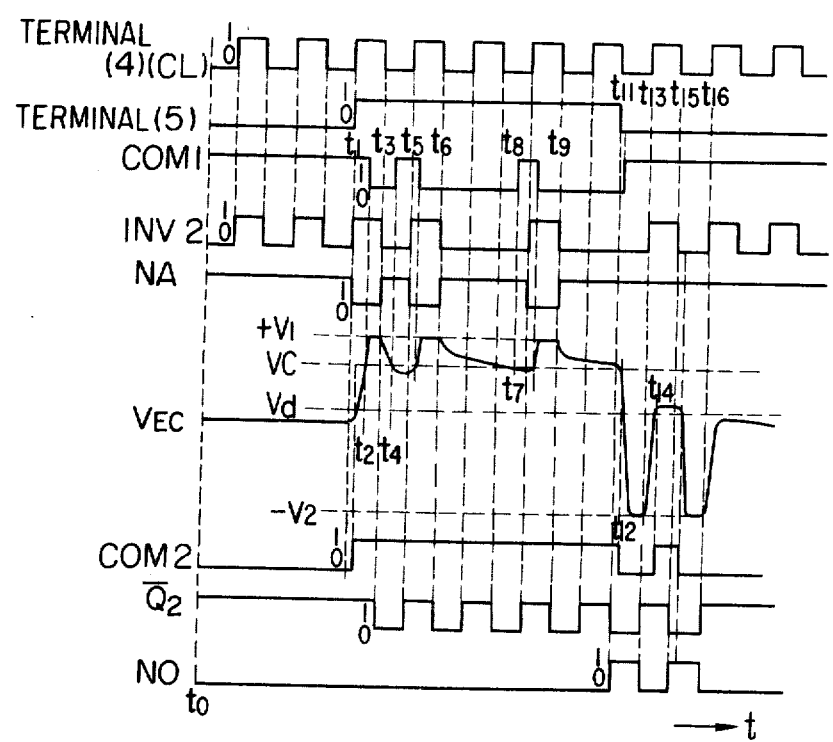
FIG. 4 is a time chart of the signals in the circuit of FIG. 3.

Reference is now had to FIG. 4 to describe the operation of the present device. Before the display command signal is applied, namely, when the signal being applied to the terminal 5, is "0" the device is operated as shown between times $t_0$–$t_1$. When the signal "1" (command signal) is first applied to the terminal 5 in synchronism with the change of the clock pulse CL to "1" (time $t_1$), the comparator COM 1 produces a "1" because the terminal voltage of the EC element EC is zero at this time. A "1" is applied to the S terminal of the flip-flop circuit FF1 while the inverted output "0" of the clock pulse CL is applied to the R terminal of the flip-flop circuit FF1, so that the inverter INV 2 puts out "1." This output is latched until the clock pulse CL becomes "0." Accordingly, the three inputs of the NAND circuit NA are all "1" during the time when the clock pulse is "1" (between times $t_1$–$t_3$), and this circuit generates "0" during that time. Consequently, the transistor Tr1 conducts to apply a positive voltage $+V1$ to the EC element EC. However, if the quantity of charge supplied to the EC element EC during this time is insufficient, the coloration of the EC element will be insufficient, even if the terminal voltage $V_{EC}$ of the EC element exceeds Vc, and when the clock pulse becomes "0," the terminal voltage will be lower than Vc (between times $t_3$–$t_5$). Accordingly, the output of the comparator COM 1 returns to "1" (time $t_4$). Next, when the clock pulse again becomes "1" (time $t_5$), the transistor Tr1 again conducts as already described (between times $t_5$–$t_6$). Such operation is repeated until the quantity of charge stored in the EC element exceeds the predetermined value, namely, a value sufficient for the EC element to maintain a sufficient coloration state, and such that the terminal voltage of the EC element does not decrease below Vc when the voltage applied to the EC element EC is interrupted.

Description will hereinafter be made on the assumption that, in the present embodiment, a quantity of charge necessary to maintain the EC element in a sufficient coloration state has been stored at a time $t_6$. When the clock pulse CL becomes "0" at time $t_6$, the output of the NAND circuit NA becomes "0" and the transistor Tr1 becomes non-conductive so that no voltage is applied to the EC element EC. In this open condition, due to the memorizing property of the EC element EC, the terminal voltage $V_{EC}$ of the EC element does not immediately drop, but decreases slowly until time $t_7$. During that time, the EC element is maintained in a sufficient coloration state. When the quantity of charge in the EC element is decreased to the point that the terminal voltage $V_{EC}$ is decreased below the detection voltage Vc, namely, when the EC element assumes an insufficient coloration state (time $t_7$), the output of the comparator COM 1 changes from "0" to "1" and indicates that the EC element is no longer in a sufficient coloration state. Next, when the clock pulse CL becomes "1" (time $t_8$), "1" and "0" are applied to the S terminal and the R terminal, respectively, of the flip-flop circuit FF1 and the output of the inverter INV 2 becomes "1." This output is latched as long as the clock pulse CL is "1." Accordingly, all the three inputs of the NAND circuit NA are "1" between times $t_8$–$t_9$ and this circuit generates "0." Thus, the transistor Tr1 conducts, the positive voltage $+V1$ is again applied to the EC element EC, and charge is again supplied to the EC element, which thus shifts the element to a sufficient coloration state. As long as the positive voltage is repeatedly applied to the EC element in this manner, while the display command signal (signal "1" to the terminal 5) is applied, this device positively maintains the coloration state of the EC element.

Description will now be made of the operation when the EC element shifts from the sufficient coloration state to the colorless state.

Assume that the voltage positive application to the EC element EC is stopped and the EC element EC is still in the sufficient coloration state, namely, that $V_C < -V_{EC}$. In this state, when the clock pulse CL becomes "0," application of the command signal is stopped (the signal applied to the terminal 5 is rendered "0" at time $t_{11}$). The terminal voltage $V_{EC}$ of the EC element at this time point is greater than the detection voltage Vd and, therefore, the output of the comparator COM 2 is "1." Consequently, "1" and "0" are applied to the S terminal and the R terminal, respectively, of the flip-flop circuit FF2, and the $Q_2$ terminal output is latched at "0" until the clock pulse CL becomes "1", namely, between times $t_{11}$–$t_{13}$. Accordingly, all three inputs of the NOR circuit NO become "0" and this circuit NO produces "1" during that time. Consequently, the transistor Tr2 conducts to apply a reverse polarity voltage $-V2$ to the EC element EC. The terminal voltage $V_{EC}$ of the EC element is thus sharply decreased and this terminal voltage $V_{EC}$ becomes lower than the detection voltage Vd (time $t_{12}$). Next, when the clock pulse CL changes from "0" to "1" (time $t_{13}$), the output of the NOR circuit NO becomes "0" and the application of voltage $-V2$ to the EC element is stopped. In a display element such as the EC element EC, if the EC element is in the sufficient coloration state and a voltage is applied in the reverse direction for a short time to decrease the terminal voltage $V_{EC}$ thereof, the terminal voltage will rise immediately after the reverse voltage is stopped, due to the residual charge of the EC element, if application of minus charge is insufficient to deplete the positive charge stored in the element (as shown between times $t_{13}$–$t_{14}$ in FIG. 14). That is, if the EC element is left in that condition, it will assume a coloration state even if color-extinction is desired. In the present device, however, when the terminal voltage $V_{EC}$ of the EC element rises to exceed the detection voltage Vd (time $t_{14}$) after the voltage application has been stopped, the output of the comparator COM 2 changes from "0" to "1" and detects that the EC element is not yet in a sufficient colorless state. Next, when the clock pulse CL becomes "0" (time $t_{15}$), "1" and "0" are applied to the S terminal and the R terminal, respectively, of the flip-flop circuit FF2, so that the output of the $Q_2$ terminal becomes "0" and this output is latched as long as the clock pulse CL is "0" (between times $t_{15}$–$t_{16}$). Accordingly, during the time period $t_{15}$–$t_{16}$, the three inputs of the NOR circuit NO are "0" and this circuit produces "1." Thus, the transistor Tr2 conducts to again apply the reverse voltage $-V2$ to the EC element. In this manner, voltage application in the reverse direction of the EC element is repeated and, when the terminal voltage thereof is decreased below Vd, with the voltage application in the reverse direction of the EC element stopped, namely, when the quantity of charge in the EC element is decreased below the predetermined value, the EC element assumes a sufficient colorless state. After that, the output of the comparator COM 2 does not become "1" and, therefore, the transistor Tr2 does not conduct and the voltage approaches zero with the EC element maintained in a sufficient colorless state.

In the present device, the display command signal and the output signals of the first and second detecting circuits are produced in synchronism with the clock pulse. However, the present invention may also be constructed without the command signal being synchronized with the clock pulse.

I claim:

1. A device for controlling an electro-optical display element of the type which is capable of storing charge, the display element being in a colored state upon the application thereto of a first polarity voltage for storing a first quantity of charge and being in a colorless state upon the application thereto of an opposite polarity voltage for storing a second quantity of charge, the display element remaining in said states for predetermined periods of time after removal of said voltages, comprising means for detecting the quantity of charge stored in the display element, the detecting means including a first detecting circuit for producing a first signal when the quantity of charge stored differs from a first predetermined range of values required for the display element to be in the colored state, and a second detecting circuit for producing a second signal when the quantity of charge stored differs from a second predetermined range of values required for the display element to be in the colorless state, and drive means for applying said voltages to the display element, the drive means including a first driving circuit for applying the first polarity voltage to the display element in response to the first signal and to the occurrence of a display command signal, and a second driving circuit for applying said other polarity voltage to the display element in response to the second signal and to the non-occurrence of the display command signal.

2. A device according to claim 1, wherein said first detecting circuit includes:
   a circuit for generating a first standard voltage corresponding to a value of stored charge within said first predetermined range of values; and
   a circuit for comparing the voltage on a terminal of said display element with said first standard voltage.

3. A device according to claim 1, wherein said second detecting circuit includes:
   a circuit for generating a second standard voltage corresponding to a value of stored charge within said second predetermined range of values; and
   a circuit for comparing the voltage on a terminal of said display element with said second standard voltage.

4. The device of claim 1 further comprising means for generating a clock signal having first and second states, and wherein the first driving circuit includes means for enabling application of the first polarity voltage to the display element when the clock signal is in the first state, and the second driving circuit includes means for enabling application of the other polarity voltage to the display element when the clock signal is in the second state.

5. The device of claim 4, wherein the enabling means of each of the driving circuits includes gate means which receives as inputs the display command signal, the clock signal, and an appropriate one of said first and second signals from the first and second detecting circuits.

6. The device of claim 5, wherein the output of each of said gate means drives a transistor switch connected to an input terminal of the display element.

7. The device of claim 1, wherein the first and second detecting circuits each include means for producing the first and second signals in synchronism with a clock signal applied to the first and second detecting circuits.

8. The device of claim 1, wherein the first and second predetermined ranges are different ranges and are separated from one another by a range of values of stored charge in which the display element is in an intermediate state between the colored state and the colorless state.

* * * * *